United States Patent
Vij et al.

(10) Patent No.: US 8,373,710 B1
(45) Date of Patent: Feb. 12, 2013

(54) METHOD AND SYSTEM FOR IMPROVING COMPUTATIONAL CONCURRENCY USING A MULTI-THREADED GPU CALCULATION ENGINE

(75) Inventors: Amit Vij, Arlington, VA (US); Nima Negahban, Woodbine, MD (US)

(73) Assignee: GIS Federal LLC, Arlington, VA (US)

( * ) Notice: Subject to any disclaimer, the term of this patent is extended or adjusted under 35 U.S.C. 154(b) by 0 days.

(21) Appl. No.: 13/457,106

(22) Filed: Apr. 26, 2012

Related U.S. Application Data

(60) Provisional application No. 61/581,711, filed on Dec. 30, 2011, provisional application No. 61/638,203, filed on Apr. 25, 2012.

(51) Int. Cl.
*G06F 15/16* (2006.01)
(52) U.S. Cl. ............................................. 345/502
(58) Field of Classification Search ............... 345/502
See application file for complete search history.

(56) References Cited

U.S. PATENT DOCUMENTS

| | | | | |
|---|---|---|---|---|
| 6,578,197 | B1* | 6/2003 | Peercy et al. | 717/143 |
| 7,663,633 | B1* | 2/2010 | Diamond et al. | 345/503 |
| 7,911,471 | B1* | 3/2011 | Allen et al. | 345/522 |
| 7,996,839 | B2* | 8/2011 | Farkas et al. | 718/102 |
| 8,135,926 | B1* | 3/2012 | Glasco et al. | 711/155 |
| 8,199,156 | B2* | 6/2012 | Antoine | 345/502 |
| 2002/0135582 | A1* | 9/2002 | Suzuoki et al. | 345/502 |
| 2004/0263519 | A1* | 12/2004 | Andrews et al. | 345/502 |
| 2012/0050259 | A1* | 3/2012 | Solomonov et al. | 345/419 |
| 2012/0154410 | A1* | 6/2012 | Baik et al. | 345/502 |
| 2012/0192200 | A1* | 7/2012 | Rao et al. | 718/105 |

OTHER PUBLICATIONS

Jon McLoone, Wolfram Blog, Driving CUDA over the Grid, Jul. 14, 2011 (6 pages).
Unknown Author, New gridMathematica 8 adds CUDA and OpenCL support simplifying management of heterogeneous high-performance computing, Jul. 14, 2011, http://www.wolfram.com/news/gridmathematica-8-released.html (1 page).
Wolfram Research, Inc., "Wolfram White Paper, Heterogeneous Computing in Mathematica 8," Wolfram, 2011, pp. 1-28.
Wolfram Research, Inc., "Wolfram White Paper, CUDA Programming within Mathematica," Wolfram, 2011, pp. 1-23.

\* cited by examiner

*Primary Examiner* — Kee M Tung
*Assistant Examiner* — Ryan M Gray
(74) *Attorney, Agent, or Firm* — MH2 Technology Law Group, LLP

(57) ABSTRACT

A computing system may include a plurality of GPUs, one or more CPUs, and a data store containing data to be analyzed. A user may register a calculation to be performed on the data, and the system may determine a scheme for allocating portions of the calculation and subsets of the data to different GPUs for concurrent execution. The system may also modify a user-provided algorithm to convert portions of the algorithm that are path-dependent into atomic path-independent operations that may be performed by GPU threads asynchronously. The system may also determine coordination operations sufficient for merging sub-results generated from individual GPU threads' execution of the atomic operations back into a path-dependent computation. The system may be configured to use any number of similar or different GPU devices, and for GPU devices to be added to or removed from the system without requiring programmers to alter their algorithms.

22 Claims, 10 Drawing Sheets

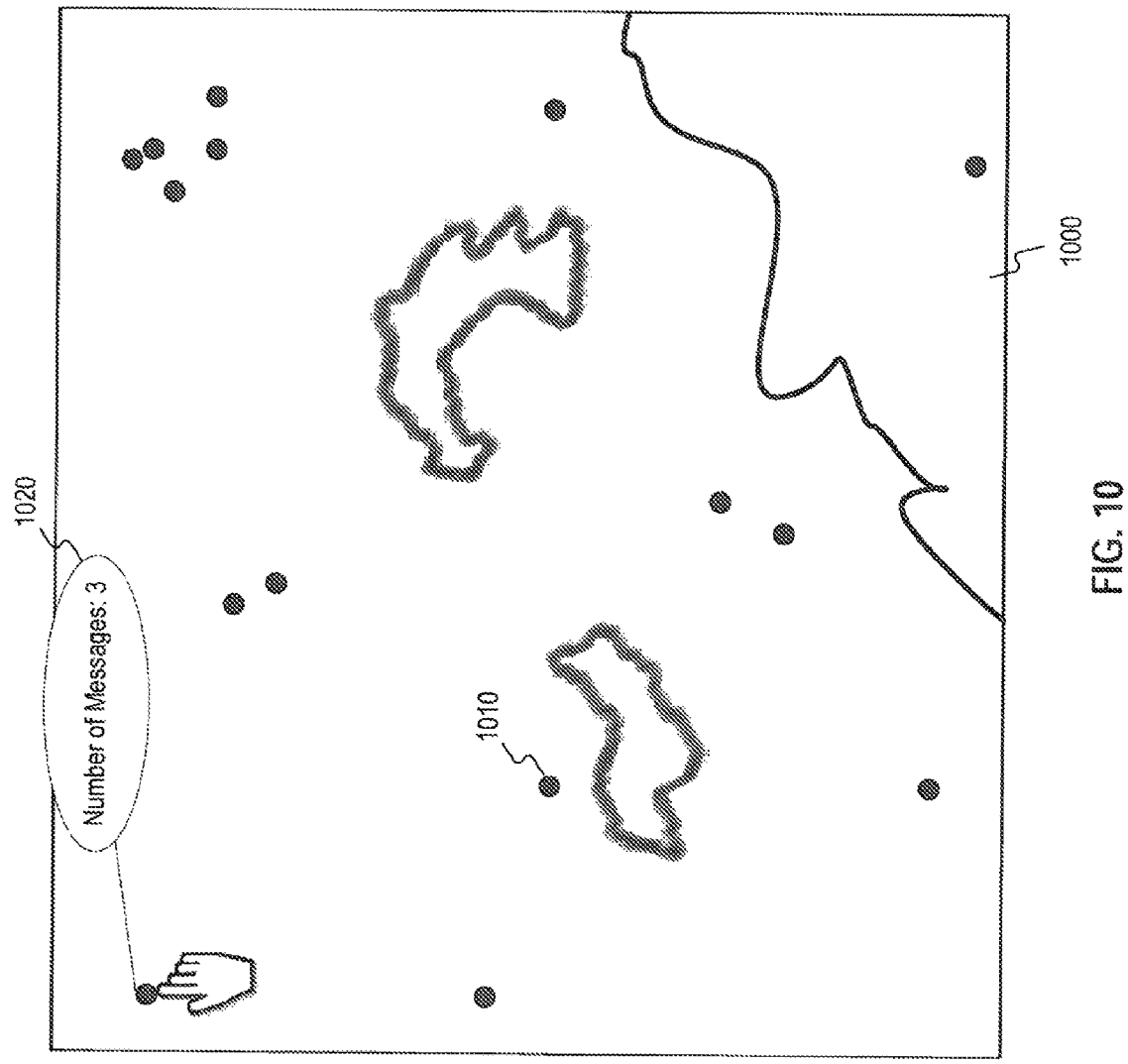

METHOD AND SYSTEM FOR IMPROVING COMPUTATIONAL CONCURRENCY USING A MULTI-THREADED GPU CALCULATION ENGINE

CROSS-REFERENCE TO RELATED APPLICATIONS

This application claims priority to U.S. Provisional Patent Application No. 61/581,711 filed Dec. 30, 2011 and U.S. Provisional Patent Application No. 61/638,203 filed Apr. 25, 2012, which are hereby incorporated by reference in their entirety.

TECHNICAL FIELD

The present disclosure relates generally to methods, systems, and computer-readable media for improving computational concurrency using a multi-threaded GPU calculation engine.

BACKGROUND

Technological advances in memory density and manufacturing over the last 30 years have led to an abundance of relatively cheap, high-capacity memory storage devices. Such an abundance has correspondingly led to an increase in the amount and types of information captured and stored for analysis. For example, satellites capture millions of images of land and terrain from space, Internet servers capture petabytes of information about Internet traffic and patterns, and databases store millions or even billions of records about users, store inventories, or government data.

However, although processing power and speed have also improved during this period, processing nonetheless remains a significant bottleneck to making effective use of valuable stored information. For example, calculations or queries involving more than 5-10 million data records in even the most advanced commercial databases may take hours or even days to complete using standard processing techniques.

One technique for improving computational efficiency has been to increase the number of devices or processors working on a particular calculation or query. For example, many commercially available central processing units (CPUs) now contain multiple processing units, also known as "cores," each of which is capable of executing instructions simultaneously. However, because CPU cores consume significant power and generate significant heat, high-end multicore processors are usually limited to only six or eight cores. As a result, some supercomputing architectures have shifted to utilizing one or more graphics processing units (GPUs) to perform calculations, since GPU cores generally consume less power and may therefore be multiplied to a greater extent in a single chip. For example, currently available high-end GPU chips may include as many as 448 or more distinct processing cores, an order of magnitude larger than CPU chips.

Moreover, CPUs and GPUs typically differ significantly with respect to their threading capabilities. Although both a CPU core and a GPU core may spawn multiple threads when executing instructions, CPU threads tend to be only virtual as opposed to truly concurrent. In particular, in a CPU core, multithreading is typically accomplished by rapidly switching back and forth between different threads, giving only the appearance of concurrency. By contrast, in a GPU architecture, multiple threads may be capable of executing at the same time.

These characteristics of GPUs—i.e., the ability to employ a greater number of cores per chip and to perform parallel threading—have thus made the use of GPUs increasingly attractive for supercomputing applications due to their greater potential for significant parallelization. However, in practice, the high level of parallelization that is theoretically possible in a multicore, multi-threaded GPU is often not achievable for a number of reasons.

For example, one obstacle to parallel processing is that in order for multiple cores and/or threads to simultaneously execute instructions for any significant period of time, they must each be supplied with a continuous stream of data on which to operate. As a result, programmers who wish to take advantage of the potential parallelization offered by GPUs must program their algorithms in a such manner as to continuously supply each GPU core and/or thread with new data, which in turn requires knowledge of the particular characteristics of the GPUs on which the algorithms will operate. Such characteristics include each GPU's memory capacity and bandwidth, number of cores and threads per core, number of flops per second, etc.

Not only is it impractical for programmers to determine these low-level hardware characteristics and to structure their algorithms around such device-specific considerations, but their algorithms may further become inoperable or obsolete should underlying device implementations change. For example, a single-GPU computing system may be upgraded with a GPU that has an increased core- or thread-count, or CPUs may be added or subtracted from multi-GPU computing system over time. As a result, even the smallest changes to GPU configuration may require significant revisions to algorithms designed to take advantage of concurrency.

Moreover, even if an algorithm is structured so as to evenly divide data and operations between multiple GPU cores and/or threads, sustained parallelization may still not be achieved due to calculation path-dependency issues. Path-dependency may refer to the necessity of performing operations in a particular sequence or to an inability to perform a second operation until operands are obtained from execution of a first operation. For example, in a simple programming loop structure, such as a for-loop, operations presented in the body of the loop may be dependent on certain conditions being satisfied by the loop variables. Path dependency may present a barrier to parallelizing the execution of certain calculations using GPUs, since threads that may be capable of executing certain operations may be forced to wait until other operations have first been performed or necessary input data has been generated.

Accordingly, computing systems that are used to perform calculations over large amounts of data may be improved by techniques for utilizing multiple GPU devices in a way that improves the concurrency with which those GPU devices are able to execute without requiring programmers to customize their algorithms based on the specific characteristics of the GPUs used.

SUMMARY

The present disclosure addresses these and other improvements to computing systems. In some embodiments, a computing system may include a plurality of GPUs, one or more CPUs, and a data store containing data to be analyzed. The system is configured to allow a user to register a calculation to be performed on the data. During the registration process, the system may determine the characteristics of the plurality of GPUs in the system, including characteristics such as memory capacity, number of cores, and number of threads per core. Based on the characteristics of the plurality of GPUs, the system may determine an efficient scheme for allocating portions of the calculation to different GPUs for concurrent execution.

The system may also determine an efficient plan for "chunking" the data—i.e., dividing up the data on which the calculation is to be performed so as to increase the degree to which each GPU core and/or thread is provided with a steady stream of data for performing its constituent operations. In some cases, in order to ensure that each GPU core and/or thread can continue to work concurrently, multiple copies of some data may be made so that different. GPU cores that need access to the data to work on their respective shares of the problem can execute concurrently and without waiting for other GPUs cores to release locks on memory regions.

The system may also perform a number of translations or conversions on the algorithm provided by the user when registering a calculation in order to optimize concurrency. In some embodiments, the system may convert portions of the algorithm that are path-dependent into atomic path-independent operations that may be performed by GPU threads asynchronously. The system may also determine coordination operations sufficient for merging sub-results generated from the individual threads' execution of the atomic operations back into a path-dependent computation. The system may also provide one or more libraries that enable programmers themselves to improve the path-independency of their algorithms.

The system may be configured to use any number of similar or different GPU devices, and for GPU devices to be added to or removed from the system over time. By keeping track of the specific characteristics of each GPU device in the system, the system can automatically divide up operations and data inputs to those operations efficiently among the plurality of GPUs according to the specific characteristics of each GPU device, such as memory capacity and bandwidth. Thus, programmers can be freed up to focus their efforts on writing effective data calculation algorithms without having to worry about underlying device characteristics. Programmers can also know that their algorithms will continue to be executed with improved concurrency even if the device configuration of the system is changed.

Additional objects, advantages, and embodiments of the present disclosure will be set forth in part in the description that follows, and in part will be derived from the description, or may be learned by practice of the disclosed embodiments. The objects, advantages, and embodiments of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed. It is also to be understood that use of the word "exemplary" throughout the application is to be understood as providing examples that may be useful for illustrating general principles or concepts; thus, figures and descriptions identified as "exemplary" should not be interpreted as representing the best or only approaches to practicing the disclosed embodiments.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings:

FIG. 10 is a diagram depicting an exemplary application of the present disclosure for visualizing information having geographical attributes using GIS imagery.

DETAILED DESCRIPTION

Figure 1:
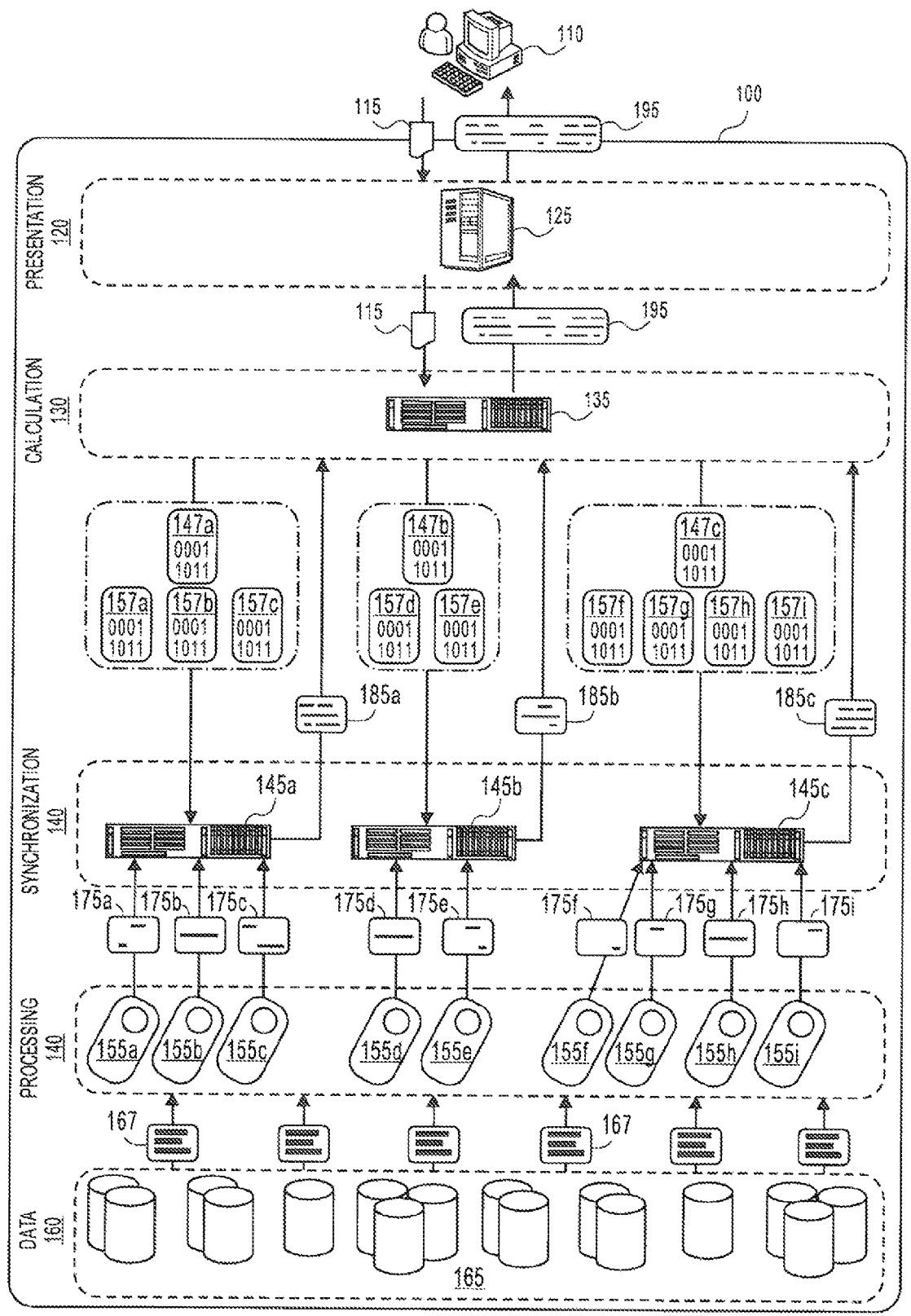
FIG. 1 is a diagram depicting an exemplary hardware and software configuration for a GPU-powered computing system, consistent with certain disclosed embodiments.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting an exemplary hardware and software configuration for a GPU-powered computing system, consistent with certain disclosed embodiments. As depicted in FIG. 1, a GPU-powered computing system 100 may comprise various devices, such as a general purpose web server 125, a computing device 135 that includes one or more CPUs, a plurality of GPUs 155 clustered within one or more nodes 145, and one or more memory devices that, together, form a data store 165.

In some embodiments, the components of system 100 may further be logically or structurally arranged according to a plurality of layers 120-160 for the purpose of implementing one or more of the techniques described below. Such layers may include a presentation layer 120, a calculation layer 130, a synchronization layer 140, a processing layer 150, and a data layer 160.

Presentation layer 120 may represent an interface layer between one or more client devices 110 and system 100. Client device 110 may be any desktop, laptop, or mobile computing device capable of communicating with system 100. Client device 110 may interface with system 100 by connecting—e.g., by network or serial connection—to one or more computing devices within presentation layer 120. As further described below, by interfacing with presentation layer 120, a user may provide instructions to system 100 for storing particular types of data, for registering calculations to be performed with respect to the stored data, for instructing system 100 to execute the registered calculations, and for receiving results of the executed calculations. In some embodiments, presentation layer 120 may include one or more web servers 125 that receive and service requests from client devices 110 using hypertext transfer protocol (HTTP) communications. However, those skilled in the art will appreciate that client device 110 may communicate with system 100 using other techniques.

Presentation layer 120 may receive one or more requested calculations from client device 110, and may forward details of such requests on to calculation layer 130 for registration or execution. In some embodiments, calculation layer 130 may comprise one or more CPU-powered computing devices 135 capable of receiving text strings representing algorithms associated with requested calculations and converting such algorithms into instructions capable of execution by a plurality of GPUs in system 100. As further described below, calculation layer 130 may communicate such instructions to synchronization layer 140 in the form of one or more executable kernels 157.

Synchronization layer 140 may comprise one or more nodes 145, which may represent one or more computing devices housing at least one CPU. Each node may further house one or more GPUs 155 capable of executing associated kernels 157. For example, as depicted in FIG. 1, nodes 145a, 145b, and 145c are depicted as housing three, two, and four GPUs, respectively. GPUs 155 may be homogenous or heterogeneous in nature. For example, different GPUs may be manufactured by different entities and/or may have different architectural characteristics, such as different memory capacities or bandwidths, different cache configurations, different core-counts, different thread-counts, etc.

For purposes of illustration, GPUs 155, together, may represent a processing layer 150. GPUs may operate on data copied from one or more memory devices 165 that, together, comprise a data layer 160. As contemplated by the present disclosure, GPUs may be added to or removed from nodes, or additional nodes may be added to system 100. Those skilled in the art will appreciate that the hardware and software layer configuration depicted in FIG. 1 is for illustration purposes only, and that other configurations may be used. For example, in practice, individual nodes 145 may house tens or even hundreds of individual GPUs.

Figure 2:
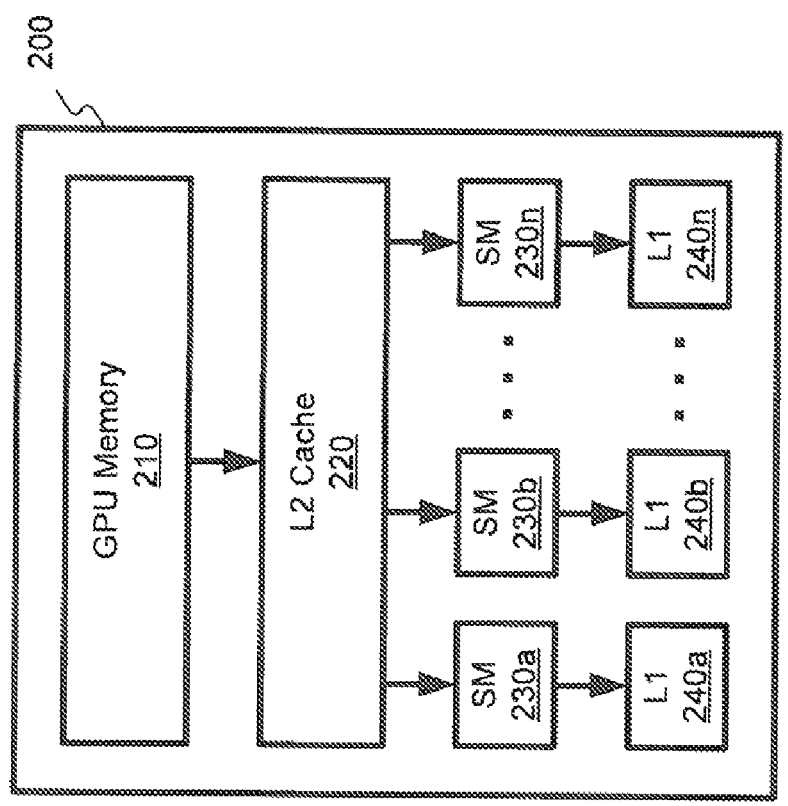
FIG. 2 is a diagram depicting an exemplary architecture of a graphical processing unit, consistent with certain disclosed embodiments.

FIG. 2 is a diagram depicting an exemplary architecture of a graphical processing unit, consistent with certain disclosed embodiments. As depicted in FIG. 2, an exemplary GPU 200 may include GPU memory 210, also known as video random access memory (VRAM), which may represent the largest memory store on GPU 200, but may also be the slowest in terms of writing and reading data. GPU 200 may also include a level 2 cache 220 memory component, which may represent a memory component on GPU 200 that is capable of storing less data than GPU memory 210, but is capable of faster reading and writing operations.

GPU 200 may include a plurality of streaming multiprocessors 230a-230n, also known as cores. Each core 230 may be capable simultaneously executing one or more threads. GPU 220 may additionally include a separate level 1 cache 240 memory component for each streaming multiprocessor 230. Each level 1 cache 240 may be able to store less data than level 2 cache 220, but may be capable of faster reading and writing operations. Each streaming multiprocessor 230 may access data stored in level 2 cache 220 or an associated level 1 cache 240. In some architectures, level 2 cache 220 may be coherent, such that a data-write operation to level 2 cache 220 by one streaming multiprocessor 230 may immediately be seen by other streaming multiprocessors 230, whereas each level 1 cache 240 may not be coherent across multiple threads.

In contrast to CPU devices, the threads of each streaming multiprocessor 230 may be capable of concurrent execution, in contrast to virtual threads. In some GPU architectures, thread concurrency may be achieved by providing a GPU core with an instruction, in response to which each thread in the GPU core simultaneously executes the same instruction on a different set of data, an architecture sometime referred to as "single instruction multiple data" (SIMD).

Thus, as described above, one advantage of using GPUs to perform calculations in system 100 is that, unlike CPU threads, the multiple threads of a GPU may each simultaneously perform operations. Such concurrency may be used to realize significant performance gains when a calculation involves repeating the same or similar operations over large amounts of data. However, as described above, in order to achieve such concurrency, it may be necessary to ensure that multiple threads are continually supplied with new data on which to perform operations, and to ensure that the operations assigned to individual threads are atomic and path-independent in nature, such that threads are not kept in waiting states before they may perform their assigned operations.

FIGS. 3 through 7 describe how system 100 may be configured to achieve these goals by tracing the progression of an exemplary calculation through the various layers 120-160 of system 100. For purposes of illustration only, discussion will focus on the processing of geographic information system (GIS) image data to determine topographical characteristics of a geographic regions, such as identifying contiguous bodies of water contained entirely within regional or jurisdictional boundaries.

Figure 3:
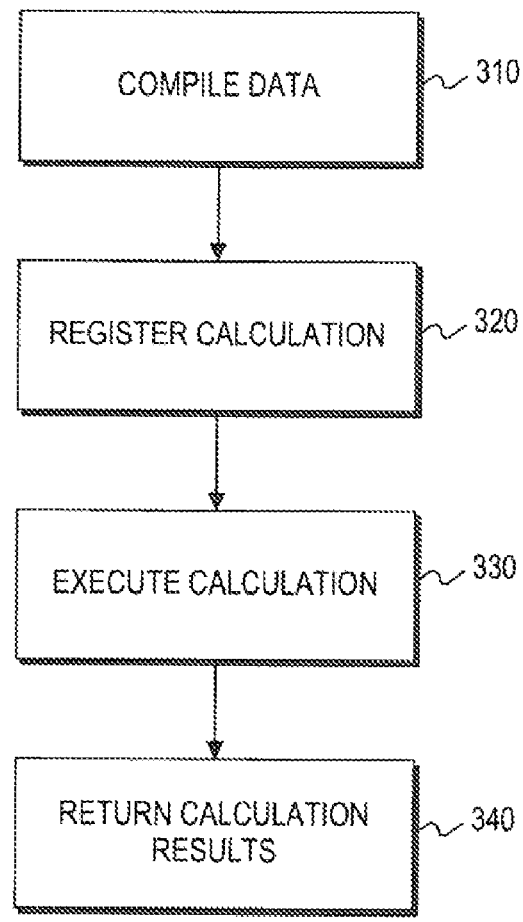
FIG. 3 is a flow diagram depicting an exemplary method of using a GPU-powered computing device to perform a calculation, consistent with certain disclosed embodiments.

FIG. 3 is a flow diagram depicting an exemplary method of using a GPU-powered computing device to perform a calculation, consistent with certain disclosed embodiments. FIG. 3 represents a high-level overview of an exemplary process. Subsequent figures will provide further details for various stages. As depicted in FIG. 3, prior to the performing of any calculations, data on which the calculations are to be performed may first be compiled and stored (step 310).

Figure 4:
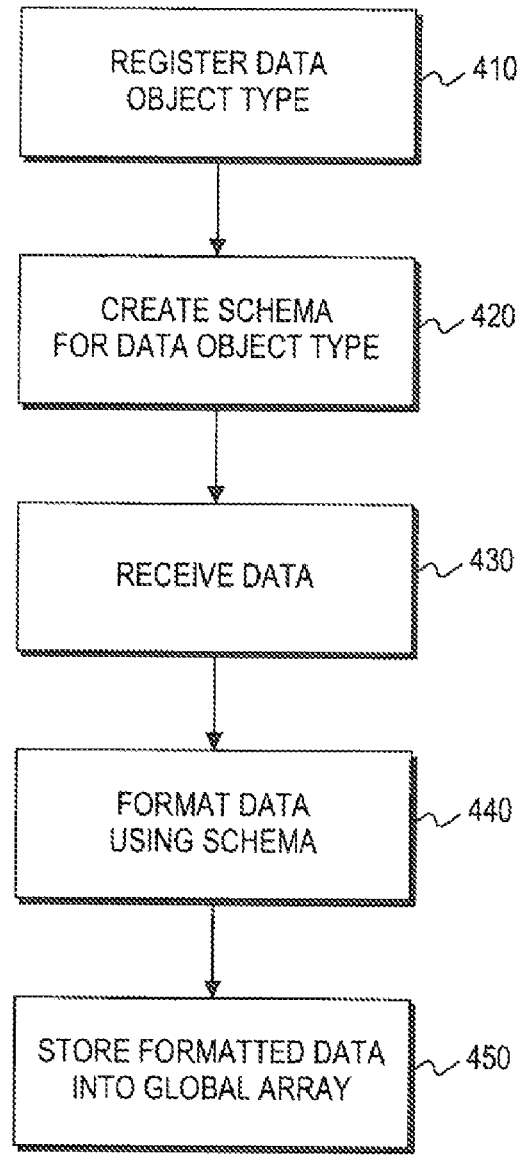
FIG. 4 is a flow diagram depicting an exemplary method of registering and storing data on which one or more calculations may be performed, consistent with certain disclosed embodiments.

FIG. 4 is a flow diagram depicting an exemplary method of registering and storing data on which one or more calculations may be performed, consistent with certain disclosed embodiments. As depicted in FIG. 4, the compilation process may begin by a user registering one or more data objects types with system 100 (step 410). For example, using client device 110, a user may log into system 100 and establish a web or other communication session with server 125. As part of the communication session, the user may specify a type of data that is to be stored in data layer 160.

For example, a user may indicate an intent to store GIS data in data layer 160 representing satellite images of the earth's topography. Such GIS data may be represented by a plurality of digital images, each of which may include one or more matrices of constituent pixels. Pixels themselves may include color data and GIS coordinate data. In this example, both images and pixels may be considered data objects from the standpoint of system 100. Thus, in step 420, presentation layer 120 may prompt the user for, or may automatically determine based on sample data, a schema for one or more data object types that are being registered.

In some embodiments, a schema for a data object type may indicate syntax or rules for representing the data object in binary memory. For example, for purposes of illustration, a schema for a GIS pixel object could specify that the pixel object should be stored as a 72-bit string representing the following ordered information:

| Object Parameter | Bit Sequence |
| --- | --- |
| Latitude: degrees | 0-7 |
| Latitude: minutes | 8-15 |
| Latitude: seconds | 16-23 |
| Longitude: degrees | 24-31 |
| Longitude: minutes | 32-39 |
| Longitude: seconds | 40-47 |
| Color: R | 48-55 |
| Color: G | 56-63 |
| Color: B | 64-71 |

Those skilled in the art will appreciate that the foregoing data object type schema is exemplary only, and that other, more complex data object type schemas may be created.

Once system 100 has created the schema for the data object type, it may begin to receive data (step 430). Data may be received in a streaming or batch-like fashion from one or more external devices. As the data is received, system 100 may format the received data using the appropriate schema (step 440) and store the formatted data into data layer 160 as a global array (step 450). For example, system 100 may store the data within one or more hard drives 165 that make up data layer 160.

Figure 5:
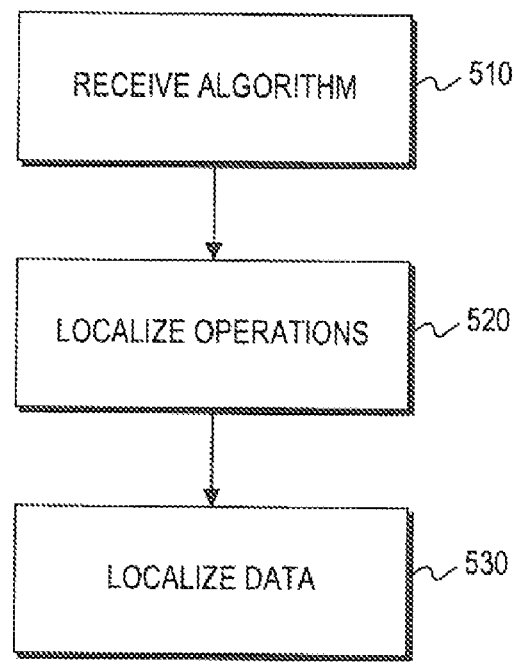
FIG. 5 is a flow diagram depicting an exemplary method of registering a calculation to be performed, consistent with certain disclosed embodiments.
Figure 6:
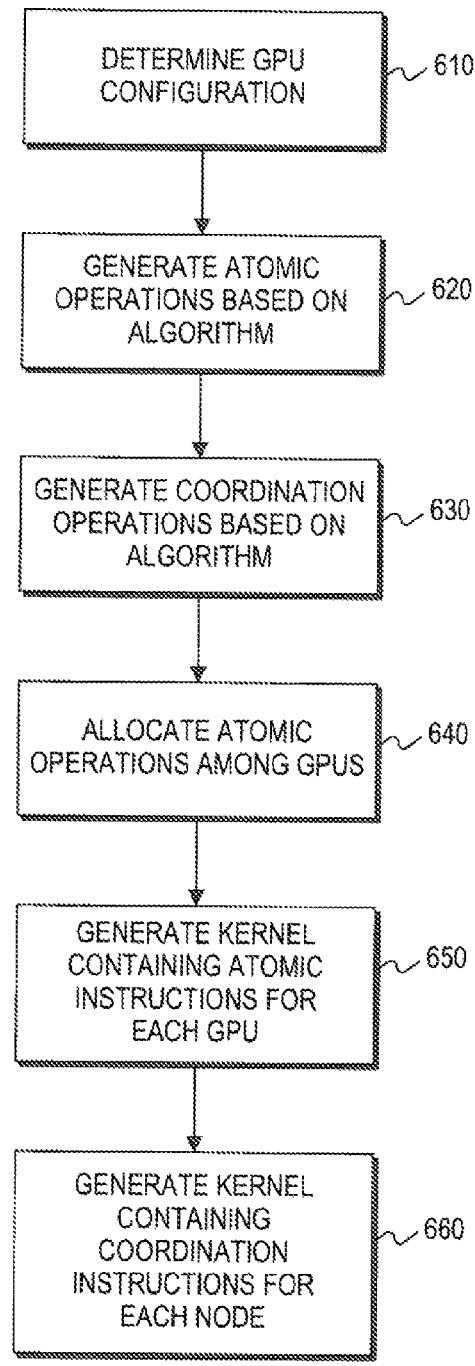
FIG. 6 is a flow diagram depicting an exemplary method of localizing computations during the calculation registration process, consistent with certain disclosed embodiments.

FIG. 5 is a flow diagram depicting an exemplary method of registering a calculation, consistent with certain disclosed embodiments. Once the data necessary to perform calculations has been ingested into system 100, the system is now ready for a user to register a calculation. Thus, in step 510, system 100 may receive an algorithm from a user. For example, as depicted in FIG. 1, the user may use client device 110 to transmit an algorithm 115 to presentation layer 120. Algorithm 115 may comprise one or more textual strings representing operations that may be used to perform the requested calculation on the stored data.

In some embodiments, the algorithm may comprise a series of instructions, specified using one or more standard programming languages such as C or Java™, for accomplishing the requested calculation. Thus, using the example of determining contiguous bodies of water contained entirely with regional or jurisdictional boundaries, the algorithm may include instructions for determining, for each regional and jurisdictional area, the complete set of GIS pixel objects that represent image data in that area; for each GIS pixel object, determining whether its color data is consistent with an expected color range of water imagery; and for each GIS pixel object identified as potentially representing water, the set of all contiguous pixels similarly consistent with water imagery. Those skilled in the art will appreciate that the foregoing algorithm instructions are exemplary only.

Next, in step 520, system 100 may localize the operations of the algorithm. In some embodiments, as depicted in FIG. 1, localizing the operations of the algorithm may comprise presentation layer 120 passing algorithm 115 down to calculation layer 130, where one or more computing devices 135 may determine how the operations of the algorithm may be segregated or modified to increase the degree to which the operations may be executed in parallel, based on the specific device configurations of synchronization layer 140 and processing layer 150. Exemplary steps for perform such localizations to improve concurrency are further depicted in FIG. 6.

In step 610, calculation layer 130 may determine the device configurations of synchronization layer 140 and processing layer 150. For example, calculation layer 130 may determine how many nodes 145 are present in synchronization layer 140 and how many GPUs 155 are resident in each node 145. Calculation layer may also determine device characteristics of each GPU 155, such as each GPU's VRAM capacity and bandwidth, memory cache configuration, number of cores, and number of threads capable of being spawned per core.

In some embodiments, calculation layer 130 may next convert some or all of the user's algorithm into two sets of operations: atomic operations and coordination operations. Atomic operations may represent operations that may be performed by one or more threads of GPUs 155 in a path-independent manner—i.e., without waiting for certain conditions to occur or without for data inputs from other operations to be determined. By contrast coordination operations may represent operations that either break path-dependent instruction sequences into constituent atomic operations or merge the results of atomic operations back into a path-dependent result or series of instructions that, when executed, derive a path-dependent result from the results of the atomic operations. Thus, in steps 620 and 630, respectively, calculation layer may 130 may generate atomic operations and coordination operations based on the user-provided algorithm.

In some embodiments, coordination operations may include operations for copying data that may be needed by two or more different atomic operations. For example, as described above, a calculation for identifying contiguous bodies of water within a regional or jurisdictional area may involve at least three separate operations that may be performed on the same GIS pixel object: (1) determining its regional or jurisdictional area, (2) analyzing is color data, and (3) comparing it to adjacent pixels. In this example, each operation may be performed on the data representing the pixel object independently of the other operations. Hence, data segments representing various GIS pixel objects may be copied such that each GPU that is to perform operations on the pixel objects stored therein may have an independent copy of the data.

In some cases, parts of a user-supplied algorithm may be difficult to segregate into path-dependent and path-independent operation sets. For example, the majority of operations specified by the algorithm may depend on certain conditions being satisfied or on receiving input data. Thus, in some embodiments, generating atomic operations may comprise generating operations that are capable of atomic execution even if their results might ultimately be discarded.

For example, it may be determined that a path-dependent operation specified in an algorithm cannot be executed until it receives a particular input, the value of which is unknown until run-time. However, if it can be determined that the input value will likely fall within a certain range of integers, then a set of atomic operations can be generated to be performed by a separate thread or GPU core, each operation including using a different value within the range as an input. Although, at run-time, the result of only one such operation may be used (e.g., merged back into a path-dependent result), the thread tasked with executing that operation will be able to execute it during run-time in an atomic and asynchronous manner—i.e., without having to wait for any condition or input value. Moreover, because of the significant number of operations that may be performed by separate threads in a highly concurrent processing environment, the "wasted" operations of the threads whose results were not used may be significantly outweighed by the efficiencies that allowed the single thread whose result was used to execute without delay.

Once atomic and coordination operations have been determined based on the user-supplied algorithm, in step 640, calculation layer 130 may allocate various atomic operations among or between GPUs. Calculation layer 130 may allocate atomic operations in a manner designed to increase concurrency. For example, in the above example, calculation layer 130 could allocate to node 145a (and, hence, GPUs 155a-155c) atomic operations for determining regional or jurisdictional areas associated with each pixel object, to node 145b (and, hence, GPUs 155d-155e) atomic operations for analyzing each pixel object's color data, and to node 145c (and, hence, GPUs 155f-155i) atomic operations for identifying adjacent pixels. Calculation layer 130 may determine which nodes or GPUs should receive which atomic operations based on the characteristics of each GPU, including memory capacity and bandwidth, GPU core- and thread-count, and GPU processing speed.

In some embodiments, after calculation layer 130 has determined an allocation of atomic operations among nodes or GPUs, calculation layer 130 may generate programming language code for each GPU capable of instructing each GPU to perform its allocated operations in a manner consistent with its architecture. Such code may be generated in the form of Compute Unified Device Architecture (CUDA™), a GPU programming language supported by Nvidia™ GPUs, or Open Computing Language (OpenCL), a framework for writing programs that execute across heterogeneous CPUs and GPUs, and other processors.

For each GPU 155 for which calculation layer 130 has generated such code, it may compile a kernel from the code (step 650), which may represent an executable or bytecode representation of the code. As depicted in FIG. 1, calculation layer 130 may generate a separate kernel 157 for each GPU 165 that instructs each GPU 155 how to perform its specifically allocated operations in a manner consistent with its architecture. For example, kernel 157a may pertain to GPU 155a, kernel 175e may pertain to GPU 155e, kernel 157g may pertain to GPU 155g, etc.

In some embodiments, calculation layer 130 may also allocate some or all coordination operations to one or more nodes 145. For example, node 145a may be tasked with coordinating the sub-results of its GPUs' execution of path-independent operations into one or more path-dependent results. Such instructions may be provided to one or more nodes 145 for execution by the nodes' CPUs, and may be compiled into one or more CPU-executable or bytecode kernels.

Thus, as depicted in FIG. 1, after calculation layer 130 has determine atomic operations and coordination operations, has allocated such operations to individual GPUs and node CPUs, and has generated executable kernels based on the allocated operations, calculation layer 130 may pass the kernels down to synchronization layer 140. For example, calculation layer 130 may pass a CPU-executable kernel 147a (representing coordination operations to be executed by one or more CPUs) and GPU-executable kernels 157a-157c (representing atomic operations to be executed by respective GPUs 155a-155c) to node 145a. Calculation layer 130 may pass similar packages to nodes 145b and 145c, as depicted in FIG. 1.

Returning to FIG. 5, after computations have been localized, system 100 may then localize data (step 530). In some embodiments, localizing data may involve determining a scheme for copying data from data layer 160 to processing layer 150 in a manner that takes advantage of the particular characteristics of each GPU 155. In particular, calculation layer 130 may determine operations for copying data so as to increase the amount of data stored in the VRAM of each GPU 155 on which the threads of the GPU are capable of executing their allocated atomic operations—i.e., to supply each GPU core with a steady stream of data on which to operate—a process that may also be referred to as "chunking."

Similar to the allocation of atomic operations, calculation layer 130 may determine efficient chunking operations based on the specific characteristics of GPU 155, such as its memory capacity and bandwidth, its core- and thread-count, its processing speed, etc. Chunking operations may also be determined based on the determined allocation of atomic operations during the operation localization stage 520. Chunking operations may also include operations for copying data from data layer 160 across multiple nodes, GPUs, or GPU cores in order to facilitate parallel and asynchronous execution of atomic operations. In some embodiments, chunking operations may be delegated to nodes 145 for execution by node CPUs and, thus, included within associated CPU kernels 147. In still further embodiments, localizing data in step 530 may include copying an initial set of data to one or more GPUs 155 in order to reduce latency when the user instructs system 100 to execute the registered calculation.

Returning to FIG. 3, once the calculation has been registered, user device 110 may be notified by presentation layer 120 that system 100 has completed the registration process. Next, in step 330, a user may instruct system 100 to execute the registered calculation. Exemplary steps for executing a registered calculation are further depicted in FIG. 7, which steps are further illustrated in FIG. 1.

Figure 7:
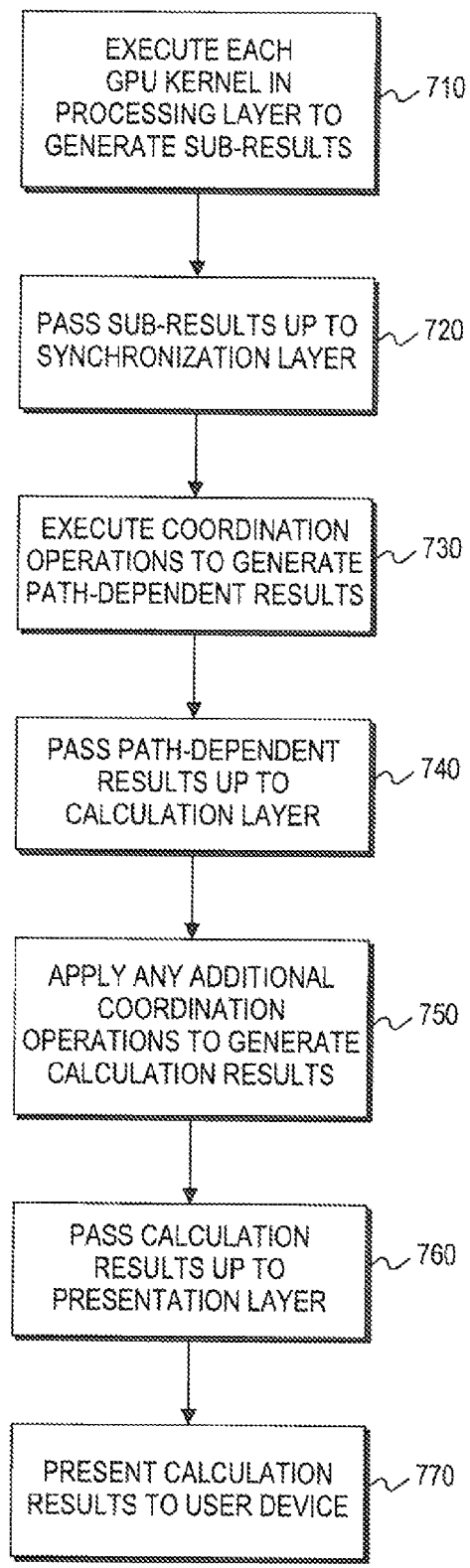
FIG. 7 is a flow diagram depicting an exemplary method of performing a registered calculation, consistent with certain disclosed embodiments.

As depicted in FIG. 7, executing the registered calculation may involve executing each kernel 157a-157i, using the associated GPUs 155a-155i in processing layer 1.50 (step 710). GPUs 155 may generate sub-results of the atomic operations that have been allocated to them, and may pass such sub-results up to synchronization layer 140 (step 720). For example, as depicted in FIG. 1, each of GPUs 155a-155i generates a set of respective sub-results 175a-175i that are then passed up to synchronization layer 140.

Synchronization layer 140 may then execute coordination operations to generate path-dependent results (730). For example, as depicted in FIG. 1, one or more CPUs in each of nodes 145a-145c may execute an associated CPU kernels 147a-147c in order to merge path-independent sub-results 175 into path-dependent results 185a-185c. Synchronization layer 140 may then pass such path-dependent results 185 up to calculation layer 130 (step 740).

In some embodiments, calculation layer 130 may itself perform various coordination operations to merge the path-dependent results 185 from synchronization layer 140 into a set of final calculation results 195, which may then be passed up to presentation layer 120 for formatting and other presentation operations. Presentation layer 120 may then format the calculation results 195, if necessary, and present them to the user device 110 (step 770).

Those skilled in the art will appreciate that the steps depicted in FIG. 7 may not be performed in a fully ordered or separated manner. For example, because the data on which the registered calculation is performed may be voluminous, GPUs 155 may continually execute atomic operations over new data, passing associated sub-results up to synchronization layer 140 as they are generated. Synchronization layer 130 may also continually merge sub-results into path-dependent results as sub-results are received, and may in turn continually retrieve and chunk data from data layer 160 in order to supply GPUs 155 with a continuous stream of data on which to operate. In some cases, each of steps 710 through 750 may be performed continuously as new data is retrieved from data layer 160, processed by processing layer 150, merged by synchronization layer 140 and/or calculation layer 130. In some cases, steps 760 and 770 may also execute continuously, such as when results are presented to the user as they are calculated.

EXEMPLARY APPLICATION

Figure 8:
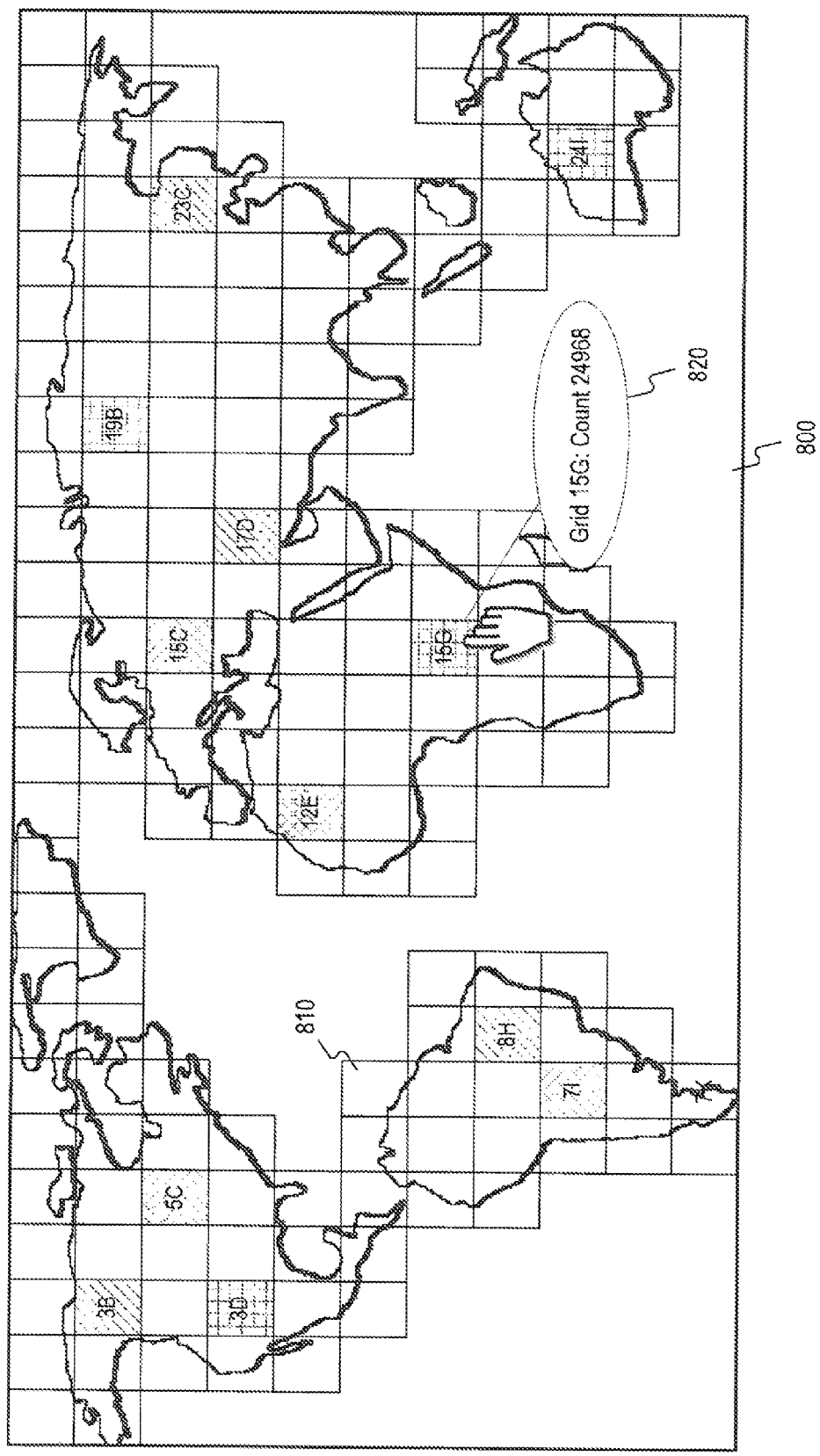
FIG. 8 is a diagram depicting an exemplary application of the present disclosure for visualizing information having geographical attributes using GIS imagery.

In some embodiments, the foregoing system may be used to implement an application for using GIS imagery for visualizing information that has a geographical component. For example, as depicted in FIG. 8, an image 800 of a geographical area may be presented on a display device for viewing. Here, image 800 may represent an image or composite image of the earth's surface as captured by one or more satellites.

Additionally, a grid may be overlaid on top of image 800 that includes a plurality of cells 810. Each cell may represent a distinct geographical area and may have dimensions of a certain number of degrees of latitude and a certain number of degrees of longitude. Each cell 810 may be associated with and/or labeled with a distinct identifier. For simplicity, FIG. 8 depicts labels (e.g., "3B," "15G," "24I," etc.) for only a subset of cells 810.

In some embodiments, the data stored in data store 165 may comprise information tied to particular geographical locations. For example, an event may have occurred at a particular geographic location, or a message or communication may have originated from a particular geographic location. In these and other cases, the event or message may be stored as a data object that includes both its geographical location and its informational content.

The above described architecture and algorithms may be used to visualize such information by dynamically formatting graphical indicators overlaying satellite imagery of the earth's surface (or synthetic imagery based thereon). For example, in one embodiment, at a high geographical zoom level, each grid cell 800 may be color coded according to how many events or messages fall geographically within the area encompassed by the cell. In FIG. 8, for ease of illustration, patterns are used instead of colors to represent the event- or message-count for cells, and only a subset of the cells are so depicted. In practice, however, most or all cells may be color coded.

Additionally, in some embodiments, the display may provide a way for a user to see the event- or message-count associated with a particular cell, such as by displaying a message 820 when a cursor enters the cell area or the cell is selected using other actions. Thus, as depicted in FIG. 8, cell 15G has an event- or message-count of 24,968.

When the number of event or message objects stored in data store 165 is large, it may be a significant computational burden to generate and display the kind of information depicted in FIG. 8. For example, it may require processing hundreds of thousands or millions of event or message data objects to determine, for each data object, which grid cell 810 the event or message falls within based on its geographical data. Then, once all records are processed, it may require counting the number of events or messages falling within each grid cell to determine a total event- or message-count. For record sets containing hundreds of thousands or millions of records, such computations may take hours or days using conventional computational techniques.

Figure 9:
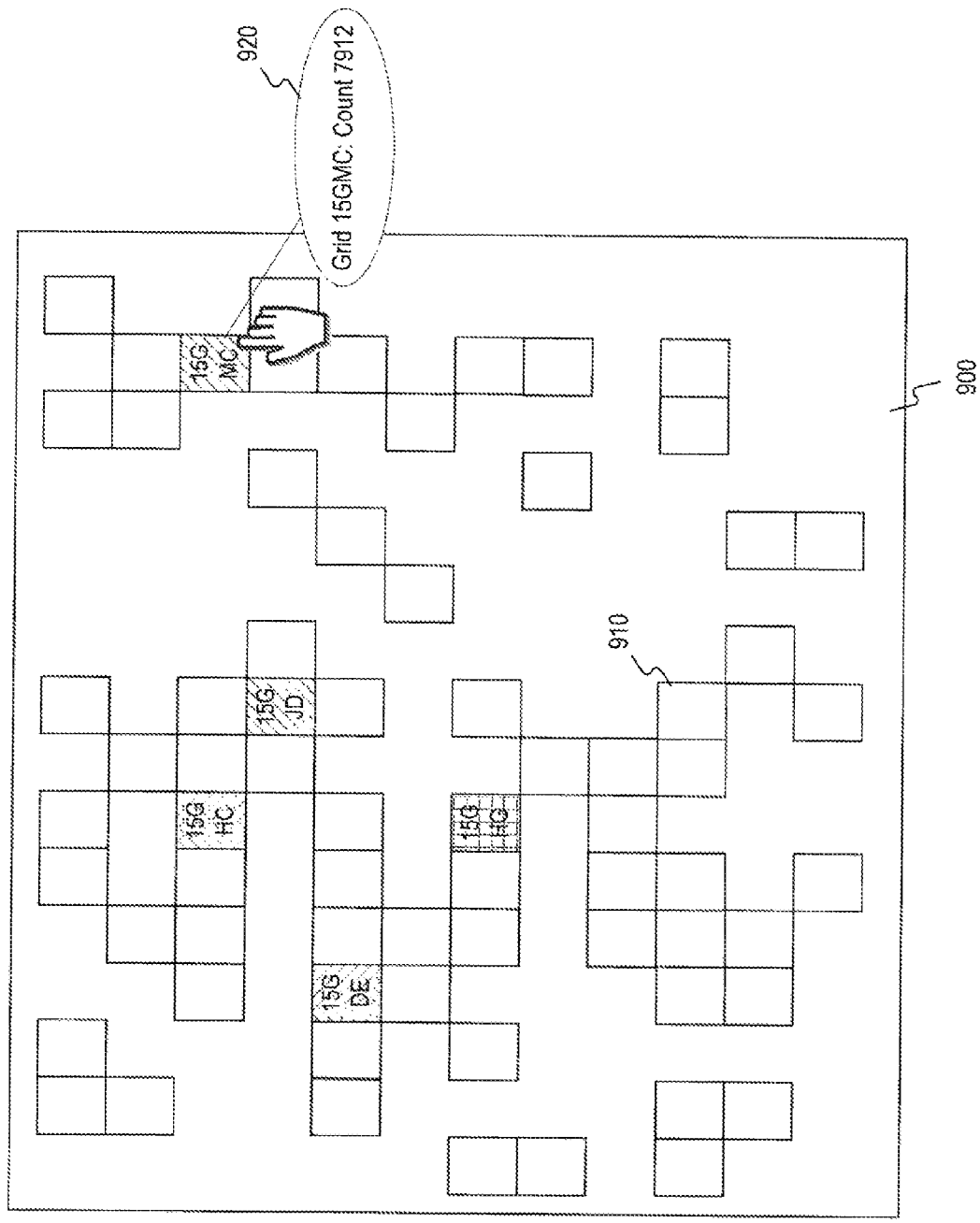
FIG. 9 is a diagram depicting an exemplary application of the present disclosure for visualizing information having geographical attributes using GIS imagery.

In some embodiments, the application depicted in FIG. 8 may further provide functionality for enabling users to adjust the zoom level at which information is displayed. For example, as depicted in FIG. 9, a user may elect to zoom the display to an image 900 that includes the contents of grid cell 15G only. Once the user has zoomed down to the level of grid cell 15G, a new grid may be overlaid on image 900 that includes a plurality of grid cells 910. Each grid cell 910 may cover a smaller subset of image 900, such as a certain number of minutes of latitude and a certain number of minutes of longitude.

Similar to FIG. 8, each grid cell 910 may be associated with a distinct label and may be color-coded according to how many events or messages are associated with the geographical area represented by the grid cell. For ease of illustration, FIG. 9 depicts labels and color codes (in the form of patterns) for only a subset of grid cells 910.

Also, similar to FIG. 8, the display may provide a way for a user to see the event- or message-count associated with a particular cell, such as by displaying a message 920 when a cursor enters the cell area or the cell is selected using other actions. Thus, as depicted in FIG. 9, cell 15GMC has an event- or message-count of 7,912.

A user may continue to zoom to lower levels. FIG. 10 depicts an image 1000 that represents only the contents of cell 15GMC. As can be seen in FIG. 10, once the user has zoomed to a sufficiently low level, rather than displaying grid cells, individual points 1010 may be depicted, each point representing an actual location in which an event occurred or from which a message was received. Thus, when a cursor is placed on or near a point, the system can display a message 1020 indicating the event- or message-count associated with the point.

Although FIGS. 8-10 depict zooming operations in which the user has zoomed from a map of the whole earth to the contents of a particular cell 15G, to the contents of another smaller cell 15GMC, in practice, zooming operations may be more fluid. For example, rather than zooming from image 800 to the contents of a single cell 15G, the user could instead zoom in to an intermediate zoom level, such as that of a particular hemisphere or continent. Upon each zooming operation, the system may alter the grid system to match the new zoom level, and may accordingly update the grid labels and color codes to reflect event- or message-counts for the cells in the new grid system.

If the number of records stored in data store 165 is large, the calculations needed to dynamically create, label, and color-code each new grid system may be prohibitively expensive using conventional computing techniques. However, the above-described techniques for achieving concurrency may greatly speed up the rate at which such calculations may be performed by an order of magnitude or more. In particular, in some embodiments, each zooming operation may result in the analysis of all or a subset of data objects in the data store. Using one or more of the above-described techniques, calculations for individual messages or event objects may be parceled out to individual GPUs and/or threads for concurrent analysis.

In some embodiments, the foregoing system may be implemented, in whole or in part, using techniques described in U.S. Provisional Application 61/638,203, from which this application claims priority.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

What is claimed is:

1. A method of performing a calculation in a computing system comprising a plurality of graphics processing units (GPUs) and one or more, central processing units (CPUs), the method comprising:
   registering a requested calculation to be performed on data from a data store, the registering comprising:
      receiving an algorithm for performing the requested calculation;
      identifying characteristics of the plurality of GPUs in the computing system;
      determining a set of calculation operations sufficient to perform the requested calculation and capable of execution by the computing system, wherein the set of calculation operations comprises:
         a set of coordination operations capable of execution by the one or more CPUs; and
         a first set of atomic operations capable of execution by the plurality of GPUs;
   for each GPU in the plurality of GPUs:
      allocating a second set of atomic operations to the GPU based on the characteristics of the GPU, wherein the second set of atomic operations comprises a distinct subset of the first set of atomic operations;
   performing the requested calculation using the plurality of GPUs to generate one or more calculation results, wherein performing the requested calculation comprises:
      causing each GPU in the plurality of GPUs to execute the second set of atomic operations allocated to the GPU in a substantially concurrent manner; and
      executing the coordination operations using the one or more CPUs, wherein executing the coordination operations comprises:
         receiving sub-results from execution of the first set of atomic operations by the plurality of GPUs; and
         calculating the one or more calculation results of the requested calculation based on the received sub-results; and
      returning the one or more calculation results of the requested calculation.

2. The method of claim 1, further comprising:
   prior to receiving the requested calculation:
      receiving a data object type; and
      determining a schema for representing the data object type in computer memory.

3. The method of claim 2, further comprising:
   prior to receiving the requested calculation:
      receiving data representing a plurality of data objects corresponding to the data object type;
      formatting the received data using the schema; and
      storing the formatted data into the data store.

4. The method of claim 3, wherein identifying characteristics of the plurality of GPUs in the computing system comprises:
   determining one or more of the number of GPUs in the computing system, the number of cores in each GPU, the memory capacity of each GPU, and the number of threads capable of being spawned per core.

5. The method of claim 4, wherein registering the requested calculation further comprises:
   for each GPU in the plurality of GPUs, determining a distinct subset of the data from the data store on which to perform the second set of atomic operations such that each GPU in the plurality of CPUs is able to execute the second set of atomic operations allocated to the GPU in a substantially concurrent manner.

6. The method of claim 5, wherein:
   the plurality of data objects represent events or information associated with geographical locations; and
   the requested calculation comprises operations for:
      displaying a first set of GIS images representing a first zoom level;
      generating a first grid associated with the first zoom level, wherein the first grid comprises a first plurality of grid cells, each grid cell in the first plurality of grid cells covering a distinct geographical area within the first zoom level;
      for each grid cell in the first plurality of grid cells:
         determining a subset of the data objects associated with geographical locations within the geographical area represented by the grid cell; and
         displaying the grid cell as an overlay on the first set of GIS images in a manner that visually indicates a number of events or messages associated with the geographical area;
      receiving an instruction to zoom to a second zoom level;
      generating a second grid associated with the second zoom level, wherein the second grid comprises a second plurality of grid cells, each grid cell in the second plurality of grid cells covering a distinct geographical area within the second zoom level; and
      for each grid cell in the second plurality of grid cells:
         determining a subset of the data objects associated with geographical locations within the geographical area represented by the grid cell; and
         displaying the grid cell as an overlay on a second set of GIS images in a manner that visually indicates a number of events or messages associated with the geographical area.

7. The method of claim 5, further comprising:
   copying data from the data store into two or more distinct subsets associated with different GPUs.

8. The method of claim 7, wherein the distinct subset of data associated with each GPU is substantially commensurate with a VRAM capacity of the GPU.

9. The method of claim 8, wherein determining the set of calculation operations further comprises:
   converting a path-dependent code sequence into one or more of the coordination operations for inclusion into the set of coordination operations and one or more atomic operations for inclusion into the first set of atomic operations such that the one or more atomic operations are capable of being executed by the one or more GPUs in a path-independent manner, and the one or more coordination operations are capable of merging sub-results from the one or more atomic operations into a path-dependent result.

10. The method of claim 9, wherein allocating the second set of atomic operations to the GPU comprises:
   generating program code configured to instruct the GPU to perform the second set of atomic operations.

11. The method of claim 10, wherein allocating the second set of atomic operations to the GPU further comprises:
compiling the generated program code into a kernel capable of execution by the GPU.

12. A computing system comprising:
a plurality of graphics processing units (GPUs);
one or more central processing units (CPUs); and
a memory system comprising one or more computer-readable media, wherein the memory system includes instructions stored therein that, if executed by the computing system, cause the computing system to perform operations comprising:
registering a requested calculation to be performed on data from a data store stored in the memory system, the registering comprising:
receiving an algorithm for performing the requested calculation;
identifying characteristics of the plurality of GPUs in the computing system;
determining a set of calculation operations sufficient to perform the requested calculation and capable of execution by the computing system, wherein the set of calculation operations comprises:
a set of coordination operations capable of execution by the one or more CPUs; and
a first set of atomic operations capable of execution by the plurality of GPUs;
for each GPU in the plurality of GPUs:
allocating a second set of atomic operations to the GPU based on the characteristics of the GPU, wherein the second set of atomic operations comprises a distinct subset of the first set of atomic operations;
performing the requested calculation using the plurality of GPUs to generate one or more calculation results, wherein performing the requested calculation comprises:
causing each GPU in the plurality of GPUs to execute the second set of atomic operations allocated to the GPU in a substantially concurrent manner; and
executing the coordination operations using the one or more CPUs, wherein executing the coordination operations comprises:
receiving sub-results from execution of the first set of atomic operations by the plurality of GPUs; and
calculating the one or more calculation results of the requested calculation based on the received sub-results; and
returning the one or more calculation results of the requested calculation.

13. The system of claim 12, wherein the operations stored in the memory system further comprise:
prior to receiving the requested calculation:
receiving a data object type; and
determining a schema for representing the data object type in computer memory.

14. The system of claim 13, wherein the operations stored in the memory system further comprise:
prior to receiving the requested calculation:
receiving data representing a plurality of data objects corresponding to the data object type;
formatting the received data using the schema; and
storing the formatted data into the data store.

15. The system of claim 14, wherein identifying characteristics of the plurality of GPUs in the computing system comprises:
determining one or more of the number of GPUs in the computing system, the number of cores in each GPU, the memory capacity of each GPU, and the number of threads capable of being spawned per core.

16. The system of claim 15, wherein registering the requested calculation further comprises:
for each GPU in the plurality of GPUs, determining a distinct subset of the data from the data store on which to perform the second set of atomic operations such that each GPU in the plurality of GPUs is able to execute the second set of atomic operations allocated to the GPU in a substantially concurrent manner.

17. The method of claim 16, wherein:
the plurality of data objects represent events or information associated with geographical locations; and
the requested calculation comprises operations for:
displaying a first set of GIS images representing a first zoom level;
generating a first grid associated with the first zoom level, wherein the first grid comprises a first plurality of grid cells, each grid cell in the first plurality of grid cells covering a distinct geographical area within the first zoom level;
for each grid cell in the first plurality of grid cells:
determining a subset of the data objects associated with geographical locations within the geographical area represented by the grid cell; and
displaying the grid cell as an overlay on the first set of GIS images in a manner that visually indicates a number of events or messages associated with the geographical area;
receiving an instruction to zoom to a second zoom level;
generating a second grid associated with the second zoom level, wherein the second grid comprises a second plurality of grid cells, each grid cell in the second plurality of grid cells covering a distinct geographical area within the second zoom level; and
for each grid cell in the second plurality of grid cells:
determining a subset of the data objects associated with geographical locations within the geographical area represented by the grid cell; and
displaying the grid cell as an overlay on a second set of GIS images in a manner that visually indicates a number of events or messages associated with the geographical area.

18. The system of claim 16, wherein the operations stored in the memory system further comprise:
copying data from the data store into two or more distinct subsets associated with different GPUs.

19. The system of claim 18, wherein the distinct subset of data associated with each GPU is substantially commensurate with a VRAM capacity of the GPU.

20. The system of claim 19, wherein determining the set of calculation operations further comprises:
converting a path-dependent code sequence into one or more of the coordination operations for inclusion into the set of coordination operations and one or more atomic operations for inclusion into the first set of atomic operations such that the one or more atomic operations are capable of being executed by the one or more GPUs in a path-independent manner, and the one or more coordination operations are capable of merging sub-results from the one or more atomic operations into a path-dependent result.

21. The system of claim 20, wherein allocating the second set of atomic operations to the GPU comprises:

generating program code configured to instruct the GPU to perform the second set of atomic operations.

22. The system of claim 21, wherein allocating the second set of atomic operations to the GPU further comprises: compiling the generated program code into a kernel capable of execution by the GPU.

* * * * *